April 27, 1948.   J. W. DAWSON   2,440,247
WELDING SYSTEM
Filed Jan. 23, 1942
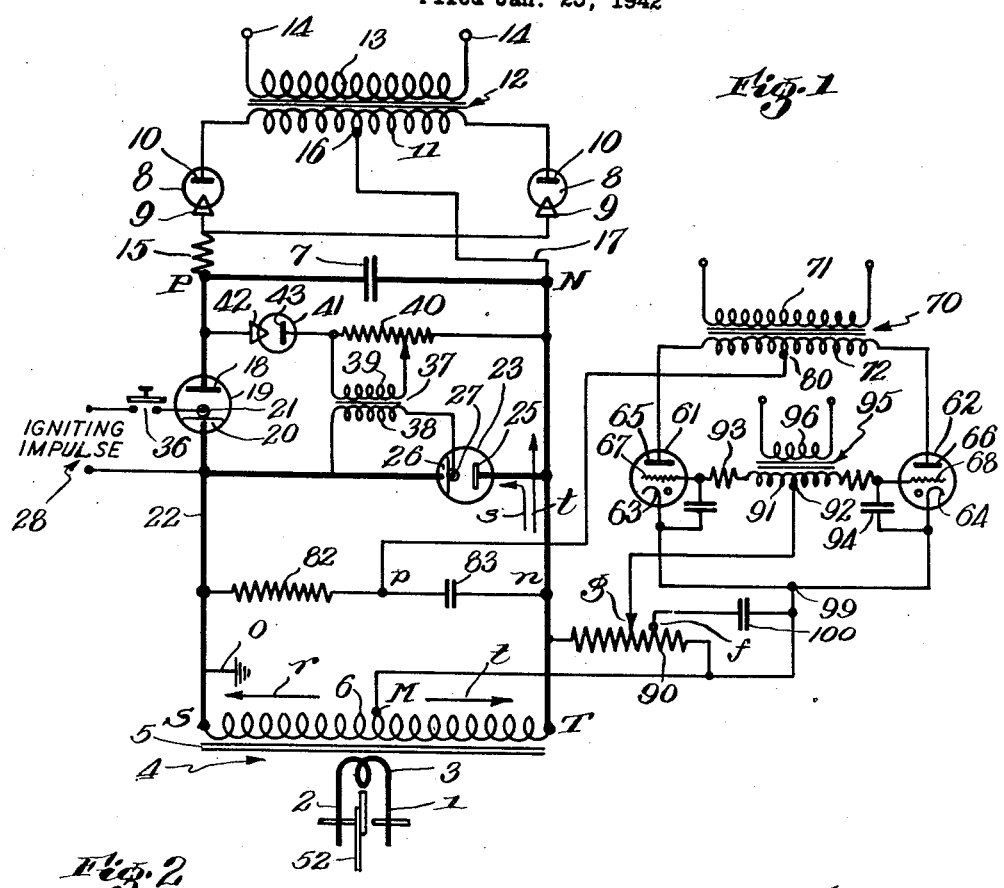
Inventor
John W. Dawson
by Elmer J. Gorn
his Atty.

Patented Apr. 27, 1948

2,440,247

UNITED STATES PATENT OFFICE 2,440,247

WELDING SYSTEM

John W. Dawson, Auburndale, Mass., assignor to Raytheon Manufacturing Company, Newton, Mass., a corporation of Delaware Application January 23, 1942, Serial No. 427,897

11 Claims. (Cl. 323—58)

This invention relates to resistance welding systems in which the welding load receives current through a transformer having a magnetic core, a pulse of current being supplied to the primary of the transformer of each weld. In such systems, particularly where each pulse of current supplied to the primary winding has a considerable direct current component, the problem of saturation of the transformer core, due to residual flux, becomes particularly troublesome. Such sequences of substantially unidirectional current impulses, however, are advantageous in resistance welding and can conveniently be provided by condenser discharges, as described and claimed in my copending application, Serial No. 309,124, filed December 14, 1939, on Condenser welding systems.

One of the objects of this invention is to provide an arrangement controlled by electric valves derived from the welding energy impulses themselves, which supplies direct current to the transformer during time periods best suited for resetting the residual flux apt to lead to saturation of the transformer core, to a value opposite that of the effective welding flux.

Another object is to provide an arrangement of the foregoing type in which pitting of the work, caused by arcing as the electrodes leave the work, is substantially eliminated.

In one aspect of the invention, the maximum resetting mmf. is applied up to the very instant when the welding energy pulse begins to flow, so that it becomes more easily possible to base the operatively effective magnetic action of the transformer on the resetting flux which may reach a negative value having an absolute magnitude as high as that of the positive flux during welding. Therefore, since the effective flux capacity is the sum of the negative and positive components, this effective flux can be greatly increased and therefore the weight of the transformer considerably reduced.

In another aspect, the source of resetting current, as for example rectifier tubes, may have a comparatively low current rating since, according to the invention, that current can be held during the selected time period at its desired value without substantially exceeding that value.

In a further aspect, the resetting current is applied to the transformer through an appropriate network timing it directly in dependance upon the configuration of the transient welding energy impulses and avoiding any possibility of improper fluctuation of the flux resetting energy.

In still another aspect of the invention, the resetting current is applied from a grid controlled rectifier arrangement whose conductivity is controlled directly by the voltage transient in the welding transformer primary.

The foregoing and other objects and aspects of this invention will be best understood from the following description, by way of example, of two practical embodiments thereof, reference being had to the accompanying drawings, wherein:

Fig. 1 is a diagram of a resistance welding system embodying my invention;

Fig. 2 is a diagram of a modification of the circuit according to Fig. 1; and

Fig. 3 is a diagram representing electrical phenomena which occur during the operation of arrangements according to Figs. 1 and 2.

In the arrangement shown in Fig. 1, welding current is to be supplied to a pair of welding electrodes 1, 2 forming the output circuit of the secondary winding 3 of a welding transformer 4. This welding transformer has a magnetic circuit represented by core member 5. The primary winding 6 of the transformer is adapted to be energized by discharges from a relatively large condenser 7 charged from a suitable source of direct current.

In Fig. 1 the direct current is shown as being supplied to the input terminals S and T of transformer 4 from the condenser 7 charged from a pair of rectifier tubes 8 which may be of the gas or vapor filled type having permanently energized cathodes 9 connected through an impedance 15 to condenser terminal P, and anodes 10 connected to the terminals of the secondary winding 11 of a charging transformer 12. This charging transformer has a primary winding 13 connected at terminals 14 to a suitable source of alternating current. The transformer secondary 11 is provided with a center tap 16 which is connected through a conductor 17 to the other terminal N of condenser 7. The impedance 15 has a value selected to maintain the proper charging rate for condenser 7.

Condenser terminal P is also connected directly to the anode 18 of a controlled ignition discharge tube 19. This tube is preferably of the pool cathode type with an igniter for initiating a cathode spot on the pool in order to cause the tube to conduct current. Although any suitable type of igniter may be used, it is preferably of the type described and claimed in the copending application of Percy L. Spencer, Serial No. 303,963, filed November 13, 1939, now Patent Number 2,290,897, for an improvement in Arc igniting devices, namely consisting of a conductor separated and insulated from the cathode by a thin glass layer. The cathode 20 of tube 19 is connected directly to one side S of the primary winding 6 by means of a conductor 22. The other side T of the primary winding is connected through conductor 17 to the other side N of condenser 7.

A tube 23 preferably of the same type as tube 19 with anode 25, pool cathode 26 and electrostatic igniter 27 is connected between conductors 17 and 22 directly across the transformer primary 6; cathode 26 is connected to conductor 22 while anode 25 is connected to conductor 17.

The tube 19 is normally non-conducting, and therefore condenser 7 retains its charge until tube 19 is ignited. Its igniter 21 is at 28 supplied with igniting impulses from a transformer, for example upon closing a push button switch 36, as described in my copending application, Serial No. 312,019, filed January 2, 1940, now Patent Number 2,294,388. In order to assist the tube in starting, a resistance in series with a condenser (not shown) may be connected across the tube, as described in the copending application of Wilcox P. Overbeck, Serial No. 271,679, filed May 4, 1939, now Patent Number 2,270,601.

The tube 23 which is likewise normally non-conducting is ignited at the proper time from an igniting transformer 37 having a secondary 38 connected between igniter 27 and cathode 26. The primary winding 39 of transformer 37 is connected across a voltage dividing resistance 40 which is connected in series with a rectifying tube 41 across the condenser 7. The rectifier tube 41 is provided with a permanently energized cathode 42 connected to the positive terminal P, the condenser 7, and with an anode 43 connected through resistance 40 to negative terminal N. The voltage across the tube 41 therefore corresponds to the voltage on the condenser 7. Since the condenser 7 is charged from rectifiers 8 so that the left-hand side is positive and the right-hand side negative (as indicated by letters P and N), tube 41 ordinarily does not conduct current.

The welding electrode 2 is usually stationary while the conductor 1 is movable toward and away from the stationary electrode. This motion may be produced by any suitable arrangement, for example such as described in my above copending application.

When the system is energized, the condenser 7 acquires a charge as previously described. The electrodes 1 and 2 may then be closed upon a piece of work 52 to be welded. Thereupon the igniting impulse is supplied to igniter 21, for example by depressing push button 36. This causes the tube 19 to start conducting current permitting condenser 7 to supply a pulse of welding current to primary winding 6, and thus to the welding electrodes 1 and 2. This discharge of condenser 7 causes the voltage thereacross to fall to zero approximately when or shortly after the maximum discharge current is flowing. Thereupon the voltage across the condenser 7 tends to reverse whereas the current tends to continue to flow in the same direction due to the inductance of the various parts of the system to which the condenser 7 is connected.

As the voltage across condenser 7 reverses, the tube 41 will start to conduct current limited in amount by resistance 40 and a short pulse of current will flow through resistance 40, setting up a voltage which is supplied to the primary winding 39 and supplies an igniting impulse to the igniter 27. Thereupon the tube 23 becomes ignited and the current instead of flowing through the condenser 7 and tube 19 flows through tube 23. As described and claimed in my above copending application, this causes substantially exponential decay of the welding current and substantially unidirectional current flow in the primary winding 6, for each welding impulse.

When the tube 23 is ignited tube 19 is extinguished, and can not thereafter restart until another igniting impulse is supplied thereto. At this time, therefore, the condenser 7 is effectively disconnected from the welding circuit, and immediately starts to recharge from the direct current supplied by rectifiers 8 permanently connected thereto. Series impedance 15 is so dimensioned that the rectifiers 8 are not called upon to supply any excessive amount of current during the conduction period of the tube 19. Since the recharging of the condenser 7 can start immediately when its voltage drops to zero, the system can be operated at maximum speed with the condenser being recharged while welding current is still flowing in the welding load. The above arrangement is therefore particularly advantageous at high welding speeds. Of course it is to be understood that the welding electrodes and switch 36 may be automatically operated so as to control timing and speed of the individual welding operations.

Since a substantially unidirectional pulse of current is supplied to the primary winding 6 for each weld and since the core member 5 has some magnetic retentivity, the core would normally be left with a residual magnetic flux (herein referred to as positive flux) at the end of each weld. Subsequent welding operations would tend to increase this flux so that the core would soon become saturated. For the purpose of resetting this flux between welds and for other above indicated purposes, the following arrangement is provided according to my present invention.

Such an arrangement may include a pair of rectifier tubes 61, 62, preferably of the gas filled type and having permanently energized cathodes 63, 64, anodes 65, 66 and control grids 67, 68. Anodes 65 and 66 are connected to respective terminals of secondary 72 of a transformer 70 whose primary 71 is supplied from a suitable alternating current source, for example transformer 12. A midpoint tap 80 of transformer 70 is connected to a point $p$ between a resistance 82 and a condenser 83 connected across primary 5 of welding transformer 4.

The cathodes 63, 64 of tubes 61, 62 are connected to a midpoint tap M of transformer 4, which tap is connected to transformer terminal T through resistance 90 constituting a voltage apportioning device.

The grids 67, 68 of tubes 61, 62 are connected through an impedance 91 having a midpoint 92 which is connected to an adjustable tap $g$ of resistance 90. Impedance 91 may form the secondary of a transformer 95 whose primary 96 is supplied with alternating current having a certain phase relationship to the alternating current supplied to transformer 70, as will be described in detail hereinbelow. Two resistances 93 are preferably inserted between secondary 91 and grids 67, 68, and two condensers 94 are connected between grid and cathode of tubes 61, 62.

The above-described arrangement operates as follows:

Referring to Fig. 3, the main condenser 7 will begin to discharge at time $a$, when tube 19 is rendered conductive by applying at 28 an igniting impulse. The direction of the discharge is indicated in Fig. 1 by arrows $t$. The condenser voltage decreases while the welding current $I_w$ increases, as shown in the upper diagram of Fig. 3 which indicates current values. During the condenser discharge, the voltage $E_T$ of transformer terminal T goes from negative towards more positive values, and the voltage $E_S$ of terminal S towards more negative values, as indicated in the lower diagram of Fig. 2 which indicates voltage values related to the potential of midpoint M as zero axis.

The impedance of condenser 83 is low as compared with that of resistor 82 so that the voltage of point $p$ between resistor 82 and condenser 83, which voltage is initially on the negative side, will, due to the effect of condenser 83, quickly change towards the positive, as indicated at $E_p$. It will be noted that $E_M$ is the voltage applied to cathodes 63, 64 of tubes 61, 62, and $E_p$ the voltage applied to anodes 65, 66 of these tubes. Therefore, from time $b$ where $E_p$ intersects $E_M$, cathodes 63, 64 are more negative than anodes 65, 66, and tubes 61, 62 are ready to fire. The grids 67, 68 are supplied with a voltage $E_g$ derived from tap $g$ of resistance 90 which, in the absence of condenser 100 is proportionate to but more negative than the voltage of point M, so that tubes 61, 62 are as yet prevented from becoming conductive.

Still assuming that the condenser 100 is not incorporated in the circuit, the voltage applied to grids 67, 68 can be so adjusted by means of tap $g$ that the grids are sufficiently positive and the tubes 61, 62 begin to fire at a time $c$ when the welding current is approximately at its peak value. From here on, the tubes 61, 62 supply rectified current $I_R$ in the direction of arrow $r$ in Fig. 1, flowing through the windings of primary 6 between points M and S and hence setting up in the transformer core a magnetic flux opposite to that due to the welding current $I_w$. It will be noted that the condenser 83 prevents flow of resetting current through primary half M—T.

At time $d$, the main transformer voltage goes in the other direction. It will be noted that, between $c$ and $d$, the rectifier tubes carry a component of the main circuit current as well as their own rectified current. Although this period is very short so that there may be no danger of overloading rectifier tubes selected to carry the current required for flux resetting, it may be desirable to modify the grid voltage control as follows.

A condenser 100 may be connected between a point $f$ of resistance 90 and transformer midpoint M which is joined to cathodes 63, 64. This condenser affects the voltage at tap 92 of grid impedance 91 by first subtracting from and later adding to and delaying the change of voltage $E_g$ towards more positive values; this modified configuration of $E_g$ is indicated at $E'_g$ of Fig. 2 and can be controlled, according to well known principles, by appropriately relating the capacity of condenser 100 and the resistance distribution between taps $g$ and $f$. With the grid voltage controlled in this manner, the tubes 61, 62 can be prevented from firing well beyond time $d$, so that they will never carry any current other than that supplied thereto from transformer 70.

In Fig. 3, the current and voltage transients obtained without condenser 100 are indicated by dotted lines whereas the values derived from a network including an element corresponding to condenser 100 are drawn in full lines.

At time $e$, the current tube 23 fires, the exponentially decaying welding current flows are indicated by arrow $s$, and the voltage across the transformer will be very slight corresponding to the drop of tube 23. The grids of tubes 61, 62 are now safely positive, the anodes and cathodes of these tubes are not adversely affected by the conditions prevailing in the main circuit and rectified current is supplied to half of the main transformer in the circuit 99—M—S—82—$p$—80, in direction $r$ opposite to the welding current flowing in direction $t$.

At the beginning of a new welding cycle at $a$, the transformer voltage distribution again renders the anodes 65, 66 more negative than the cathodes 63, 64 as above described, and the flux resetting current $I_R$ ceases to flow at $a$.

In this way the residual flux in the core member 5 is eliminated and the tendency for subsequent welding operations to saturate said core prevented. Although resetting of the residual flux to a zero value will eliminate any tendency for saturation, I prefer to supply from the rectifiers 61, 62 direct current of a value sufficient to set up in the transformer core a flux of opposite direction to the residual flux. As mentioned above, this arrangement provides greater efficiency of utilization of the core material so that the transformer 4 can be made with a much smaller core. This advantage increases with the value of the reverse flux until it is at the beginning of the succeeding weld substantially equal to the maximum flux in the opposite direction during an actual welding operation. It will be understood that the flux resetting current must not necessarily be applied to the welding transformer primary, but can be used to set up the required flux in a different way, for example by means of a separate winding.

In order to enable the grids 67, 68 to assume control for preventing with certainty the firing of tubes 61, 62 when the anode voltage is applied at time $b$, it is advantageous to use tubes, as thyratrons, with very short deionization time. In order to assure that these tubes will fire as soon as the voltage at tap $g$ has reached the intended value, this voltage is superimposed on an alternating current voltage applied to grids 67 and 68 through winding 91 constituting the secondary of transformer 95. To accomplish this purpose, the alternating current supplied to transformer 95 has a voltage which leads the voltage supplied to plates 65, 66 about 90°, for the purpose of rendering the grid voltage a maximum near the time when the critical grid potential is high at the beginning of the positive anode potential half wave.

In welding systems in which the present invention is not used, a number of welding current pulses will produce at least partial saturation. Thereupon another welding current pulse will cause the flux to rise to relatively high levels, raising that flux to regions in which saturation is definitely present. A flux in a saturated core has a tendency to collapse very quickly when the exciting magnetomotive force is removed. Such collapse induces currents of inverse sign in the secondary winding of the transformer. This inverse current will be flowing at the time the electrodes leave the work, thus causing pitting. The resetting of the flux in accordance with the present invention occurs at a relatively slow rate, and maintains the flux at a value opposite that of the main welding flux between welding impulses. This eliminates saturation and the pitting as described above.

It will now be evident that the direct current component for the resetting flux need not necessarily be supplied from a rectifier arrangement as shown in Fig. 1 but from any convenient current source, so long as the application of that component is controlled by the configuration of the welding energy impulse itself. Under certain conditions it may be advantageous to eliminate any alternating current ripples from the resetting current and to supply essentially smooth resetting current. For that purpose, an arrangement indicated in Fig. 2 may be used.

In Fig. 2 the essential elements of a welding circuit are indicated with the numerals of corresponding elements in Fig. 1. However, instead of transformer 70 with rectifier tubes 61, 62, an independent direct current supply is indicated by terminals 101, 102 which may, for example, be connected to a generator or to a multi-anode rectifier arrangement with filter circuit, which well known direct current sources are not shown in Fig. 2. The direct current supplied at 101, 102 has a polarity adapted to effect the required resetting flux.

Terminal 101 is connected to point $p$ between resistance 82 and condenser 83, whereas terminal 102 is connected to anode 115 of a control tube 110 whose cathode 113 is joined to midpoint M of main transformer primary 5. As in Fig. 1, resistance 90 is connected between points M and T. The grid 117 of tube 110 is supplied with control voltage from tap $g$ of resistance 90; a condenser 100 may again be provided in order to delay the change of the grid voltage towards more positive values, and alternating current voltage may be superimposed by means of transformer 95.

The voltages at points M, $p$ and $g$, and hence at cathode 113, anode 115 and grid 117 will be those indicated at $E_M$, $E_p$ and $E_g$ (or $E'_g$) of Fig. 3, and the resetting current $I'_R$ has the general configuration of current $I_R$, with the difference that it will be essentially smooth as indicated in Fig. 3.

It will further be evident that arrangements of which those above described are examples can not only be applied to welding systems other than those herein described, but to arrangements presenting similar control problems.

It should be understood that the present disclosure is for the purpose of illustration only and that this invention includes all modifications and equivalents which fall within the scope of the appended claims.

What is claimed is:

1. An electric control system comprising a transformer having an input winding with two supply terminals, an intermediate terminal, an output winding and a magnetic circuit coupling said windings, means for supplying to said windings a current impulse with an ascending and a decaying period and having a unidirectionally operative component, a resistance and a capacitance connected in series between said input terminals, voltage apportioning means connected between said intermediate terminal and one of said supply terminals, a current source having terminals supplying a voltage difference, electronic valve means having cathode means connected to said intermediate terminal, anode means connected in series with said source terminals to a point between said resistance and said condenser, control electrode means connected to a point of said apportioning means.

2. An electric control system comprising a transformer having an input winding with two supply terminals, an intermediate terminal, an output winding and a magnetic circuit coupling said windings, means for supplying to said windings a current impulse with an ascending and a decaying period and having a unidirectionally operative component, a resistance and a capacitance connected in series between said input terminals, voltage apportioning means connected between said intermediate terminal and one of said supply terminals, a source having terminals supplying an alternating current, electronic rectifying means having cathode means connected to said intermediate terminal, anode means connected in series with said source terminals to a point between said resistance and said condenser, and control electrode means connected to a point of said apportioning means.

3. An electric control system comprising a transformer having an input winding with two supply terminals, an intermediate terminal, an output winding and a magnetic circuit coupling said windings, means for supplying to said windings a current impulse with an ascending and a decaying period and having a unidirectionally operative component, a resistance and a capacitance connected in series between said input terminals, voltage apportioning means connected between said intermediate terminal and one of said supply terminals, a source having terminals supplying a direct current, electronic valve means having cathode means connected to said intermediate terminal, anode means connected in series with said source terminals, to a point between said resistance and said condenser, and control electrode means connected to a point of said apportioning means.

4. An electric control system comprising a transformer having an input winding with two supply terminals, an intermediate terminal, an output winding and a magnetic circuit coupling said windings, means for supplying to said windings a current impulse with an ascending and a decaying period and having a unidirectionally operative component, a resistance and a capacitance connected in series between said input terminals, voltage apportioning means connected between said intermediate terminal and one of said supply terminals, a current source having terminals supplying a voltage difference, electronic valve means having cathode means connected to said intermediate terminal, a condenser connected between said cathode means and a point of said apportioning means, anode means connected in series with said source terminals to a point between said resistance and said condenser, and control electrode means connected to a point of said apportioning means.

5. In combination, an alternating current supply circuit, a load circuit, transforming means having a magnetic core member, primary winding means and secondary winding means connected to said load circuit, normally nonconducting electric valve means connected between said supply circuit and said primary winding means, normally conducting second electric valve means poled in opposition to the first mentioned electric valve means and connected between said supply circuit and said primary winding means for transmitting current through said primary winding means in a direction opposite to that effected by said first mentioned electric valve means and at times immediately preceding the interval of conduction by said first mentioned electric valve means and for controlling the current to presaturate said transforming means, means for rendering the first mentioned electric valve means conducting and for rendering said second electric valve means non-conducting thereby effecting the transmission of an impulse of current to said load circuit, and electric valve means connected to said primary winding means and poled to provide a path for the flow of current incident to the electromagnetic energy stored in said transforming means occasioned by conduction of said first mentioned electric valve means thereby permitting the current transmitted to said load circuit to decay exponentially.

6. In combination, an alternating current supply circuit, a load circuit, transforming means having a magnetic core member, primary winding means and secondary winding means connected to said load circuit, electric valve means connected between said supply circuit and said primary winding means, control means for said electric valve means, a second electric valve means poled in opposition to the first mentioned electric valve means, control means for controlling said second electric valve means to transmit current through said primary winding means in a direction opposite to that effected by said first mentioned electric valve means and at times immediately preceding the interval of conduction by said first mentioned electric valve means and for controlling the current transmitted by said second electric valve means to pre-saturate said transforming means and for controlling the wave form of the current supplied to said load circuit, and electric valve means connected to said primary winding means for providing a path for the flow of current due to the electromagnetic energy stored in said transforming means occasioned by conduction of said first mentioned electric valve means.

7. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for pre-saturating said magnetic core member in a direction opposite to the magnetization effected by the flow of current through said electric valve means, means for rendering said electric valve means conducting and for transmitting current to said primary winding means from said alternating current circuit, and unidirectional conducting means connected to said primary winding means for providing a path for the flow of current incident to the electromagnetic energy stored in said transforming means occasioned by the conduction of current by said electric valve means and for causing the decay of current exponentially in said load circuit.

8. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for premagnetizing said magnetic core member to a point of saturation and in a direction opposite to the magnetization effected by the flow of current through said electric valve means, means for rendering said electric valve means conducting and for transmitting current to said primary winding means from said alternating current circuit, and unidirectional conducting means connected to said primary winding means for preventing the transfer of stored electromagnetic energy of said transforming means incident to the flow of current through said primary winding means to said supply circuit.

9. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for pre-saturating said magnetic core member in a direction opposite to the magnetization effected by the flow of current through said electric valve means, means for rendering said electric valve means conducting and for transmitting current to said primary winding means from said alternating current circuit, and unidirectional conducting means connected to said primary winding means to extend the duration of the impulse of current transmitted to said load circuit.

10. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for pre-saturating said magnetic core member and in a direction opposite to the magnetization effected by the flow of current through said electric valve means, means for rendering said electric valve means conducting and for transmitting current to said primary winding means from said alternating current circuit, and unidirectional conducting means connected to said primary winding means to prevent the inductance of said transforming means from extending the time of conduction of the electric valve means into the region where appreciable stored electromagnetic energy will be transferred from said transforming means to said supply circuit.

11. In combination, an alternating current supply circuit, a load circuit, transforming means having a magnetic core member, primary winding means and secondary winding means connected to said load circuit, normally nonconducting electric valve means connected between said supply circuit and said primary winding means and being of the type capable of supporting an arc discharge, a premagnetizing circuit for said transforming means for establishing a unidirectional magnetization having a direction opposite to that effected by the flow of current through said electric valve means, control means for rendering said electric valve means conducting and for transmitting current to said primary winding means from said alternating current supply circuit, electric valve means connected to said primary winding means to extend the duration of the impulse of current transmitted to said load circuit, and means responsive to said control means for controlling the conductivity of said last mentioned electric valve means.

JOHN W. DAWSON.

REFERENCES CITED

The following references are of record in the file of this patent:

UNITED STATES PATENTS

| Number | Name | Date |
|---|---|---|
| 2,120,565 | Lord | June 14, 1938 |